(12) United States Patent
Corn

(10) Patent No.: US 8,889,011 B1
(45) Date of Patent: Nov. 18, 2014

(54) METHOD OF OIL-SPILL REMOVAL

(71) Applicant: Roger Lee Corn, Walla Walla, WA (US)

(72) Inventor: Roger Lee Corn, Walla Walla, WA (US)

(*) Notice: Subject to any disclaimer, the term of this patent is extended or adjusted under 35 U.S.C. 154(b) by 0 days.

(21) Appl. No.: 14/247,849

(22) Filed: Apr. 8, 2014

(51) Int. Cl.
*B01D 15/00* (2006.01)
*C02F 1/28* (2006.01)

(52) U.S. Cl.
CPC ............... *C02F 1/285* (2013.01); *Y10S 210/925* (2013.01)
USPC ........... 210/665; 210/666; 210/668; 210/690; 210/691; 210/692; 210/693; 210/925

(58) Field of Classification Search
USPC .................. 210/925, 665–666, 668, 690–693
See application file for complete search history.

(56) References Cited

U.S. PATENT DOCUMENTS

| | | | | |
|---|---|---|---|---|
| 4,420,400 A | * | 12/1983 | Weitzen | 210/710 |
| 7,229,560 B2 | * | 6/2007 | Rink et al. | 210/693 |
| 8,702,989 B2 | * | 4/2014 | Yancy | 210/671 |

* cited by examiner

*Primary Examiner* — Chester Barry
(74) *Attorney, Agent, or Firm* — Arjomand Law Group, PLLC

(57) ABSTRACT

A method of removal of oil slicks or spills floating on the surfaces of bodies of water is disclosed in which, unlike the traditional methods, a floatable or a non-floatable oil-absorbing substance is pumped into the water under the oil-spill layer. The pumped substance will reach and lie under the oil-spill layer and cannot be blown away by wind or other causes during or after dispersion of the substance. After application of the substance, the oil layer may be naturally or mechanically agitated to facilitate formation of a removable mixture of oil and the substance. In various embodiments, after the removal of the oil-substance mixture, the oil may be separated from the mixture and be reused.

17 Claims, 2 Drawing Sheets

METHOD OF OIL-SPILL REMOVAL

TECHNICAL FIELD

This application relates generally to environmental cleanup. More specifically, this application relates to a method of removal of oil slicks or oil spills floating on the surfaces of bodies of water.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description mostly references using lighter-than-water powder-type substances for solidifying the floating oil layer that lies over a body of water, it will be appreciated that the disclosed methods may include other type substances with different weights that can be mixed with the oil and used for oil removal.

In some traditional methods of oil spill removal a natural or chemical substance is sprayed over the spilled oil layer/film that mixes with the oil and forms a solid which will be collected and removed. In such methods, while the substance is being sprayed, some of the substance may be blown away by wind or other causes or it may be blown away while resting over the oil layer but before bonding and mixing with the oil.

Figure 1:
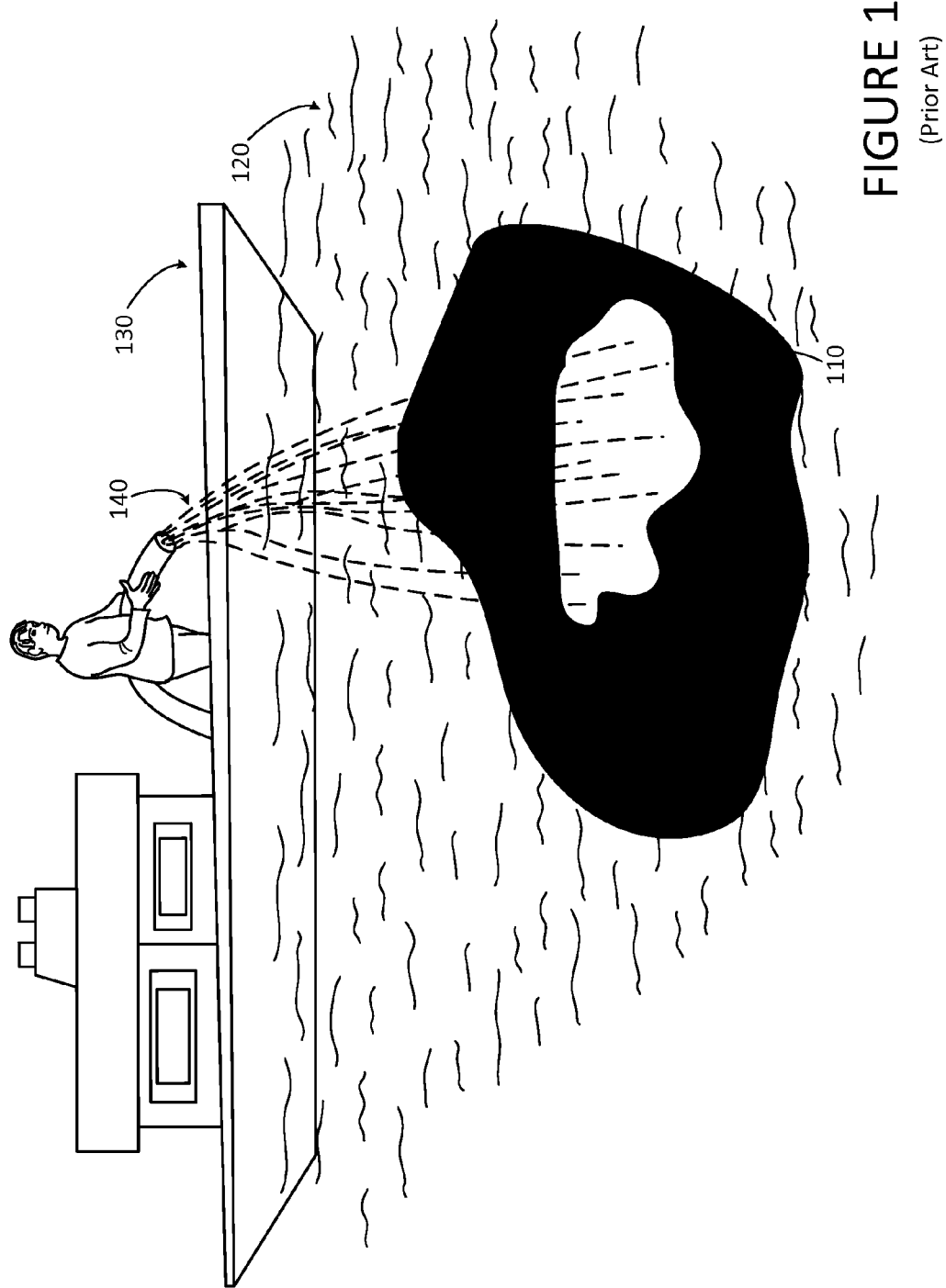
FIG. 1 shows a traditional method of removal of oil slicks or oil spills floating on the surfaces of bodies of water.

FIG. 1 shows a traditional method of removal of oil slicks or oil spills floating on the surfaces of bodies of water. In this figure oil layer 110 has been spilled over a body of water 120, for example, by a passing oil tanker in an ocean. As depicted in FIG. 1, the cleanup barge or ship 130 is spraying an oil-absorbing substance 140 over the oil layer 110. As can be easily seen from this figure, substance 140 may be blown away by wind or other causes while traveling toward the oil layer or while resting on the oil layer 110. Also, while agitating the oil layer 110 helps the oil absorbing substance 140 to mix with the oil at a faster rate, it also can blow away any unmixed substance 140 which is lying over the oil layer 110. This way, much of the oil-absorbing substance is wasted, pollutes the environment in its own right, reduces the efficiency of the operation, and increases the cleanup time, all while the environment and the eco-system is being damaged. A more efficient technique to avoid the above disadvantages is highly desirable.

Briefly described, a method of controlling oil spills in water or on land is disclosed which comprises applying a powder-type or a granulated oil-absorbing substance to an oil spill to form a solid mixture or a "cake" which can be easily removed without wasting any substance. In this new method the powder-type or the granulated substance is preferably applied to the spilled oil by pumping the substance into the water and under the oil-spill layer so that the substance rises through the water and reaches the underside of the oil layer. Unlike the traditional method in which the substance is sprayed over the oil layer, this new method prevents any of the oil-absorbing substance to be blown away before or after the substance is applied. Substances of any form, such as solid, powder, granulated, liquid, or gas may be used by the disclosed methods.

Figure 2:
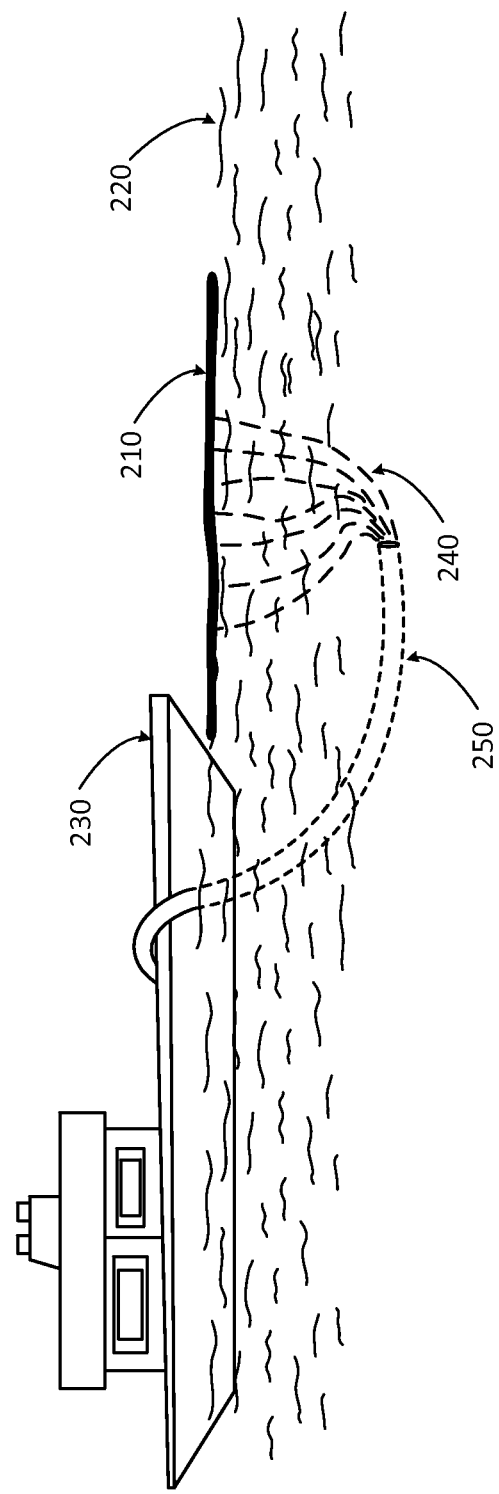
FIG. 2 shows an example of removal of oil slicks or oil spills that are floating on the surfaces of bodies of water, according to a disclosed method.

FIG. 2 shows an embodiment of the disclosed method of removal of oil slicks or oil spills that is floating on the surfaces of bodies of water. In FIG. 2 oil layer 210, shown as a cross section, has been spilled over a body of water 220, for example, by a passing oil tanker. As depicted in FIG. 2, the cleanup barge or ship 230 is pumping an oil-absorbing substance 240, through a pipe 250, under the oil layer 210. An example of this substance is MPU Powder (Micronized Polyurethane Powder) of MOBIUS Technologies, Inc. of California. As can be easily seen from this figure, substance 240 may not be blown away by wind or other causes while traveling toward the oil layer 210 or while resting under the oil layer 210. After substance 240 rests under oil layer 210, the oil layer 210 may be agitated by natural causes such as wind and water waves or by mechanical methods which will speed up and facilitate formation of the removable solid mixture; however, agitation may not be required in some cases. While floatable substances are preferable for this method, non-floatable substances may also be used if pumped relatively close to and toward the oil layer. A strong pumping of the substance toward the oil layer can also create the desired agitation of the oil layer and help the mixing of the oil and the substance. In various embodiments, after the removal of the oil-substance mixture, the oil may be separated from the mixture and be reused. In some embodiments the oil may be simply squeezed out of the mixture and also reused.

In various embodiments other mechanisms of dispersion, dispensing, and distribution of the oil-absorbing substance may be used such as using divers, manned or unmanned submarines, and automatically or controllably openable or explodable containers. In some embodiments openable containers of the substance may be dropped into the contaminated water by airplanes or helicopters and the like.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The presented specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of removal of an oil slick or an oil spill layer that floats on a surface of a body of water, the method comprising:
    dispersing a substance under the oil layer wherein the dispersed substance forms, at least partially, a cake with the oil, and wherein the substance is pumped under the oil layer from a submerged vessel; and
    removing the cake, made by the substance and the oil, from the water.

2. The method of claim 1, wherein the substance is Micronized Polyurethane Powder.

3. The method of claim 1, wherein the substance is dispersed at any depth within the water under the oil layer and wherein the dispersed substance either rises upward by natural causes or is forced to rise up and reach the oil layer.

4. The method of claim 1, wherein the substance is solid, powder, or liquid.

5. The method of claim 1, wherein the substance and the oil are mechanically agitated to speed up the cake formation.

6. The method of claim 1, wherein the cake is pressed after removal to extract the oil.

7. A cleanup method of oil contamination of a body of water, the method comprising:
    inserting a substance in the water over which the oil contamination lies, wherein the substance is dropped into the water and under the oil contamination in an automatically or controllably openable container;
    allowing time for the substance to reach the oil and to form a desired removable solid, at least with a part of the oil contamination; and
    removing the solid from the water.

8. The method of claim 7, wherein the substance is Micronized Polyurethane Powder.

9. The method of claim 7, wherein the substance is inserted at any depth within the water and wherein the inserted substance either rises upward by natural causes or is forced to rise up and reach the oil.

10. The method of claim 7, wherein the substance is pumped under the oil layer from a submerged vessel or from a floating vessel or from a shore, or a combination thereof.

11. The method of claim 7, wherein the substance is solid, powder, or liquid.

12. The method of claim 7, wherein the substance and the oil are mechanically agitated to speed up the solid formation.

13. The method of claim 7, wherein the solid is compressed after removal to extract the oil.

14. A method of removal of an oil slick or an oil spill layer that floats on a surface of a body of water, the method comprising:
    dispersing a substance under the oil layer wherein the dispersed substance forms, at least partially, a cake with the oil, and wherein the substance is pumped under the oil layer from a shore; and
    removing the cake, made by the substance and the oil, from the water.

15. A method of removal of an oil slick or an oil spill layer that floats on a surface of a body of water, the method comprising:
    dispersing a substance under the oil layer wherein the dispersed substance forms, at least partially, a cake with the oil, and wherein the substance is dropped into the water under the oil layer in an automatically or controllably openable container; and
    removing the cake, made by the substance and the oil, from the water.

16. A method of removal of an oil slick or an oil spill layer that floats on a surface of a body of water, the method comprising:
    dispersing a substance under the oil layer wherein the dispersed substance forms, at least partially, a cake with the oil, and wherein the substance is distributed under the oil contamination by a diver; and
    removing the cake, made by the substance and the oil, from the water.

17. A cleanup method of oil contamination of a body of water, the method comprising:

inserting a substance in the water over which the oil contamination lies, wherein the substance is distributed under the oil contamination by a diver;
allowing time for the substance to reach the oil and to form a desired removable solid, at least with a part of the oil contamination; and
removing the solid from the water.

\* \* \* \* \*